(No Model.) 4 Sheets—Sheet 1.

J. J. FRANKE.
MOLDING APPARATUS.

No. 435,743. Patented Sept. 2, 1890.

WITNESSES. INVENTOR.

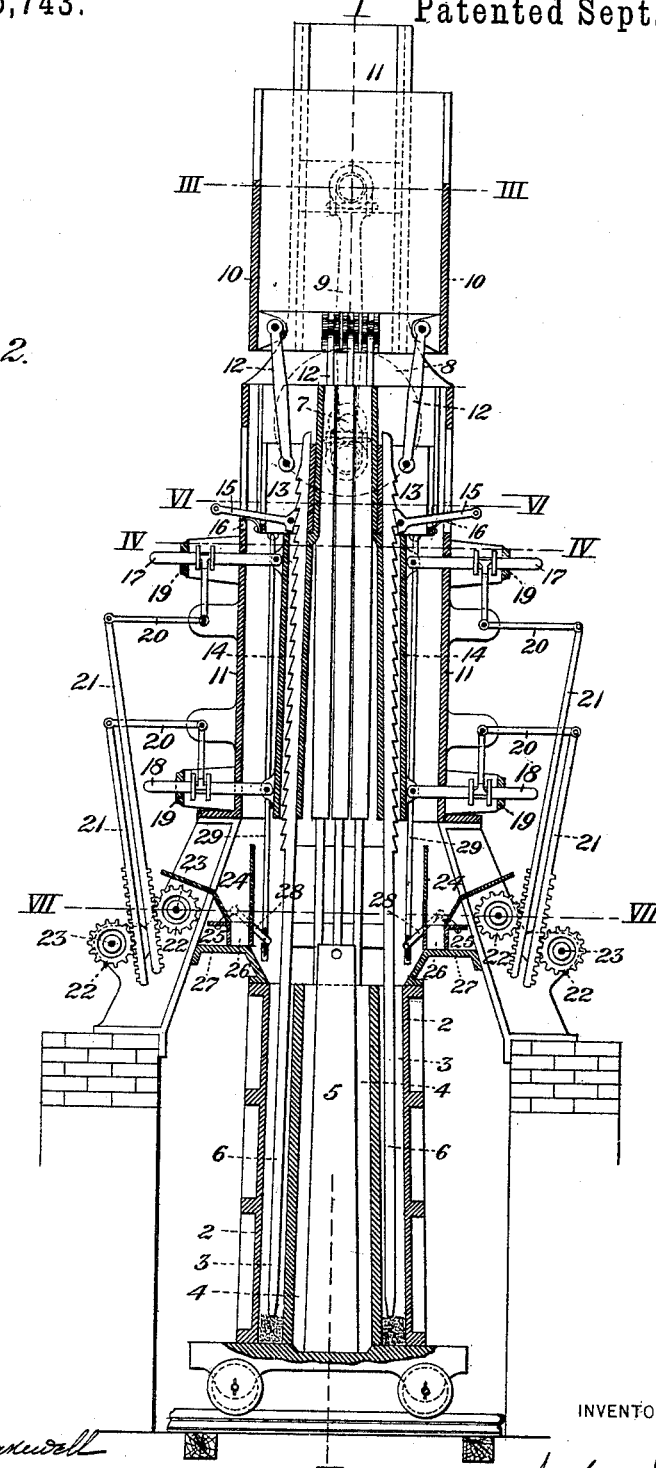

(No Model.) 4 Sheets—Sheet 3.

J. J. FRANKE.
MOLDING APPARATUS.

No. 435,743. Patented Sept. 2, 1890.

WITNESSES.
Thomas W. Bakewell
O. M. Clarke

INVENTOR.
John J. Franke

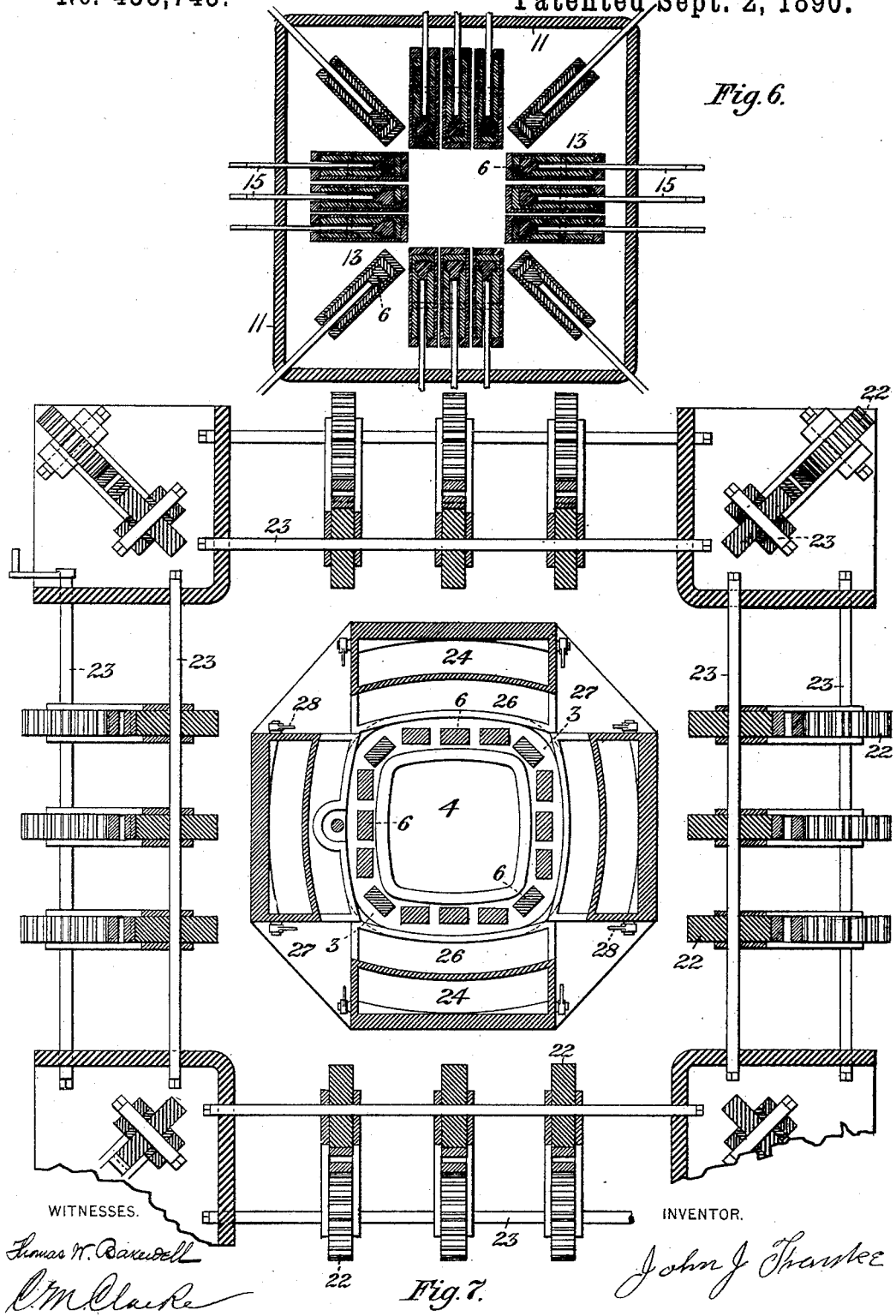

UNITED STATES PATENT OFFICE.

JOHN J. FRANKE, OF PITTSBURG, PENNSYLVANIA.

MOLDING APPARATUS.

SPECIFICATION forming part of Letters Patent No. 435,743, dated September 2, 1890.

Application filed January 17, 1890. Serial No. 337,173. (No model.)

*To all whom it may concern:*

Be it known that I, JOHN J. FRANKE, of Pittsburg, in the county of Allegheny and State of Pennsylvania, have invented a new and useful Improvement in Molding Apparatus, of which the following is a full, clear, and exact description, reference being had to the accompanying drawings, forming part of this specification, in which—

Figure 1:
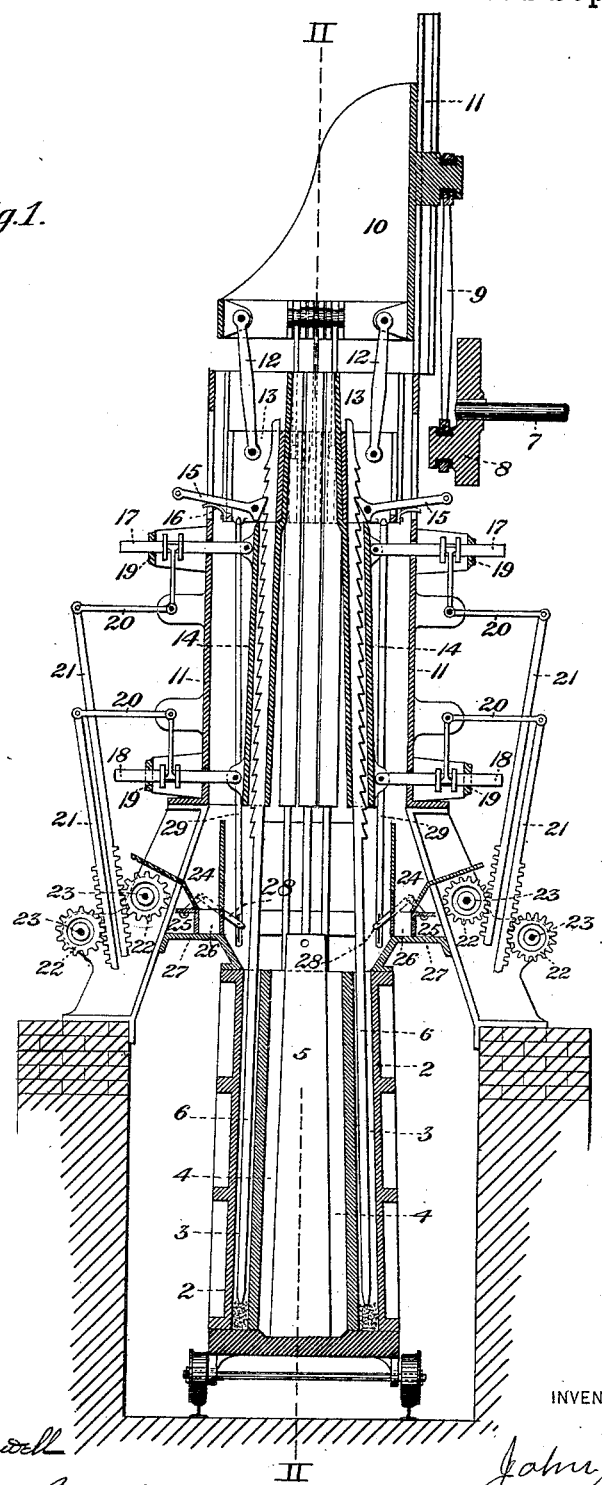
Figure 4:
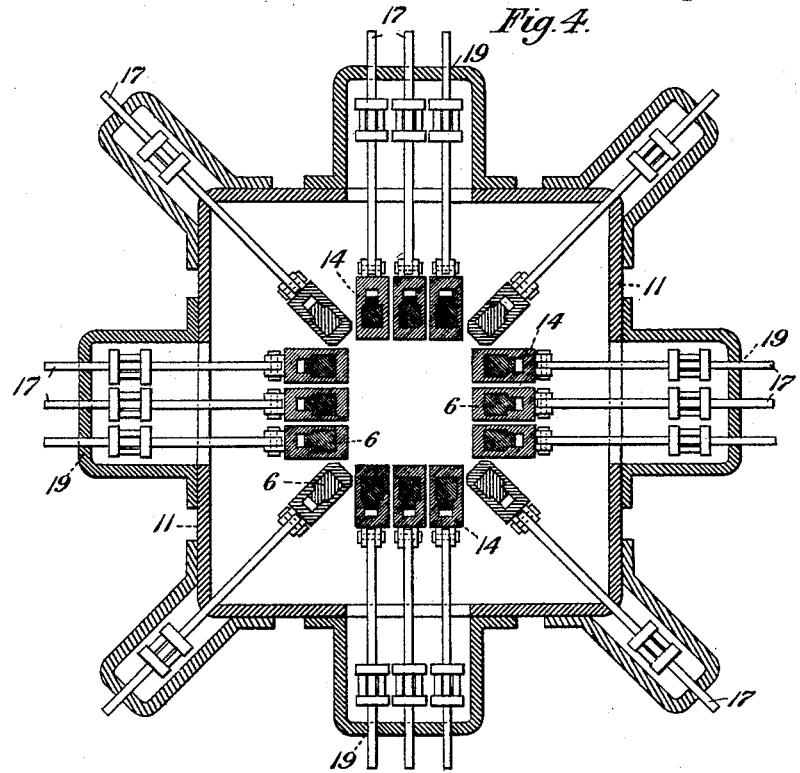
Figure 3:
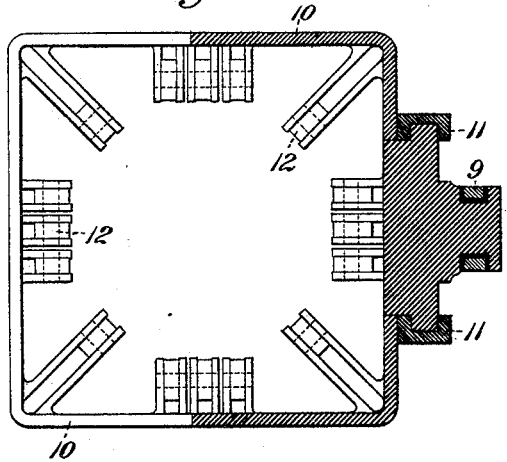
Figure 5:
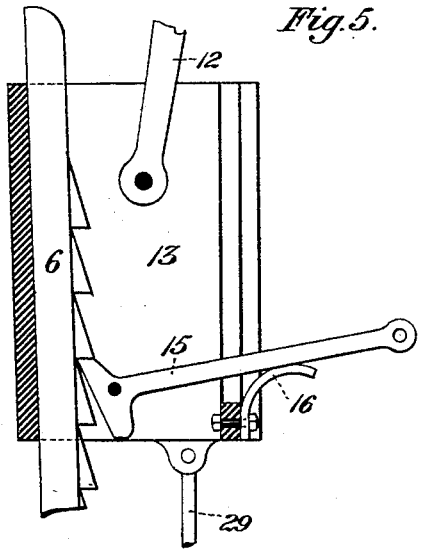

Figure 1 is a vertical section of the machine, the section being taken on the line I I of Fig. 2. Fig. 2 is a vertical section on the line II II of Fig. 1. Fig. 3 is a cross-section on the line III III of Fig. 2. Fig. 4 is a cross-section on the line IV IV of Fig. 2. Fig. 5 is an enlarged detail view showing the automatic rammer-upholding device or catch in engagement with the rammer. Fig. 6 is a cross-section on the line VI VI of Fig. 2. Fig. 7 is a cross-section on the line VII VII of Fig. 2.

Like symbols of reference indicate like parts in each.

The subject of my invention is a machine for rapidly and efficiently ramming the sand in the manufacture of molds for metal castings. It is adapted, with certain modifications in construction, to use in making molds for articles of many different shapes and is so claimed by me; but for the purpose of illustrating the invention I show in the drawings the machine constructed for ramming molds and cores for use in casting hollow ingot-molds such as are commonly used in steel plants.

In the drawings, 2 represents the flask in which the molding-sand is packed. For convenience sake I form it so that it may serve as a flask both for the mold and for its core, and to this end it is provided with a peripheral vertical cavity 3 and a central core cavity 4, which contains the usual core-barrel 5, around which the sand is rammed.

6 are the rammers, which extend vertically into the flask, and consist, preferably, of bars having their lower ends shaped in any usual way to afford efficient means for compacting the sand against which they strike. There is any suitable number of these rammers. I have shown sixteen of them, three for each side of the mold and one for each of the corners.

The following is a description of the mechanism for operating and adjusting the rammers: 7 is the main driving-shaft of the machine, which is provided with a crank wheel and pin 8, and by means of a pitman 9 is connected with a vertically-sliding head 10, which is reciprocatory in slide-bearings in the frame 11 of the machine, the shape of which frame in its several parts is shown in Figs. 1, 2, 3, 4, and 6. The sliding head 10 is connected by links 12 with a series of vertically sliding or reciprocatory heads or boxes 13, of which there is one for each of the rammers 6. The preferable shape in cross-section of these boxes is shown in Fig. 4. Each of the rammers is provided with a series of ratchet-teeth of considerable length, and the toothed portion of each extends through an upright guide-box 14 and through the sliding head 13 above the latter. As shown in Figs. 1, 2, and 4, there is a separate one of these guide-boxes 14 for each of the rammers, and the upper ends of the guide-boxes are enlarged, as shown in Figs. 2 and 6, and inclose the sliding heads 13, for which they form guides to direct them in their vertical motions. It will be understood that the guides 14 are not vertically reciprocatory, their only necessary motion being a lateral adjustment, as hereinafter explained. The rammers 6 are connected with the sliding heads 13 by pawls 15, which are pivoted to the heads and are provided with springs 16, by which they are yieldingly forced into engagement with the teeth on the rammers. In the upstrokes of the heads 13 the pawls will lift the rammers, and on their downstrokes the rammers will drop by gravity, and will be assisted in their descent by the frictional contact with the pawls caused by the pressure of the springs, which for this purpose are preferably made strong and of considerable tension. As each of the rammers is operated by a separate head 13 and pawl 15, it will be understood that their actions are independent of each other with regard to their automatic longitudinal adjustment, as hereinafter explained.

I shall now describe generally the operation of the machine in ramming a sand mold for casting. The parts being in the positions shown in Fig. 1, with the rammers within the flask-cavity 3 resting on sand at the base of said cavity, the shaft 7 is started in revolution, so as to reciprocate the sliding head 10 and to cause each of the heads 13 to reciprocate within its guide-box 14. This reciprocation of the heads 13 by means of the pawl 15 causes the rammers to reciprocate vertically and to beat upon the molding-sand at the base of the flask-cavity, and as the rammers may be made of bars of metal of considerable weight their impetus will be sufficient to pack the molding-sand firmly. From time to time additional sand is poured into the flask-cavity and is packed by the descent of the rammers, and as the height of sand in the cavity rises the rammers themselves will be forced up gradually within the heads 13 and will cause the pawls 15 to engage with successively-lower teeth. The gravity of the rammers and the force of the spring 16 are sufficient to prevent this upward motion of the rammers within the heads 13 until the added sand in the flask-cavity has been beaten down solidly. This operation of the machine, resulting in a packing of the sand and a consequent vertical rise of the rammers in the heads 13, is continued until the flask-cavity is filled with sand solidly packed, and, as each of the rammers is independent of the others in respect of its vertical adjustment caused by the addition of sand, the fact that more sand may be added to one part of the flask-cavity than to others will not cause the formation of a molding of unequal density, as would be the case if the rammers were all connected together and operated as a unit. When the outer part or shell of the sand mold has been made as above described, the rammers 6, together with the guide-boxes 14 and the sliding heads 13, may be moved inwardly relatively to each other in the manner hereinafter explained, so as to bring the rammers above the vertical cavity around the core-barrel 5. The rammers may be dropped into this cavity by disengaging the pawls 15 from the ratchet-teeth, and the operation of the machine may then be continued, as above described, until the cavity around the core is solidly packed with sand.

I shall now describe the means which I employ for adjusting the rammers laterally to bring them from the position shown in Figs. 1 and 2 into a position directly above the cavity around the core in the flask and the automatic feeding mechanism for supplying sand to the flask during the molding operations. Each of the guide-boxes 14 is supported by bars 17 18, which rest in suitable slide-bearings 19 in the frame 11 of the machine and are connected to the guide-boxes, as shown in Figs. 1 and 2. The guide-boxes being thus supported can be shifted laterally by moving said bars 17 and 18 longitudinally in their bearings, and as each of the guide-boxes is supported by a separate pair or set of the bars, they may be made capable of individual and separate adjustment. For the purpose of conveniently moving the bars 17 and 18, I provide each with a bell-crank lever 20, which may be pivoted to the machine, as shown in Figs. 1 and 2. These levers are provided with operating rack-bars 21, whose teeth are in gear with the pinions 22, the preferable arrangement of which is shown in Fig. 7. They are operated by shafts 23, having squared ends for the accommodation of a spanner or wrench, by which they may be turned, so as to move the rack-bars and to actuate the bell-crank levers for the purpose of shifting the guide-boxes laterally in either direction. In Fig. 7 I show the pinions 22 and the shafts 23 of the guide-boxes of the corner rammers individually arranged and the pinions and shafts of the other guide-boxes arranged in sets of three, which are operated simultaneously; but it will be understood that, if desired, each pinion may be provided with an individual operating-shaft, so as to make the guide-boxes quite independent in their adjustment. As shown in Figs. 1 and 2, as each guide-box has two of the bars 17 and 18, one near its upper end and the other near its lower end, which are operated independently, the guide-boxes may not only be shifted laterally, but by moving the upper ends more than the lower ends they may be inclined to the vertical to any suitable degree within certain limits. In the lateral adjustment of the guide-boxes, as above explained, they will carry with them the sliding heads 13, with which they are connected, as shown in section in Fig. 6, so that in every position of the guide-boxes the rammers which move laterally with them shall be in operative connection with the sliding heads 13 and with the links 12, to which the sliding heads are connected. In adjusting the rammers laterally to adapt them to work in connection with molding-cavities of less diameter, a less number of rammers will be required to perform the work of the machine, and therefore, if it is desired, a part only of the rammers may be adjusted inwardly and the remainder disused and disconnected from the sliding heads 13 by releasing the pawls 15 from engagement with the teeth on the rammers.

In Figs. 1 and 2 I show convenient means for automatically feeding sand to the flask. On each side of the flask at the top is a hopper 24 whose bottom 25 is provided with a pocket 26, and is horizontally movable over a plate 27. By moving this bottom back and forth over the plate the pocket is charged successively with sand from the hopper, and when the pocket reaches a position above the cavity of the molding-flask the sand drops from the pocket into the said cavity. The sliding bottom of the hopper may be moved by mechanical connection with one of the driven parts of the machine. A convenient means for operating it consists of a bell-crank lever 28, which is connected by a link 29 to one of the sliding heads 13. Each of the sliding bottoms of the hoppers should be provided with operating mechanism of this sort.

I prefer to make the connection between the link 29 and bell-crank 28 loose or slotted, so that it will operate with a slight jar or shaking action, which will cause the free discharge of the sand and will prevent its packing the pocket 26. By means of this mechanism I am enabled to feed the sand automatically and continuously during the operation of the machine and to reduce to a minimum the manual labor and attention necessary to be devoted thereto.

The advantages of my invention will be appreciated by those skilled in the art. The machine is very efficient in its action, performs its work rapidly, and is a means of saving labor in the work of sand-molding. It may be applied to use in ramming molds for castings of many different shapes, and is especially applicable to use in making molds for casting pipes. When employed for this purpose, it will be more convenient to connect the guide-boxes 14 rigidly together, so that they shall not be capable of lateral adjustment, and to employ a separate machine for each size of mold, and as pipes are usually of the same diameter throughout the rammers may all be caused to operate vertically and not at an inclination, as in molding metal ingot-molds, where the cavity of the molding is of flaring shape.

By the particular description of the parts of the machine which I have given above I do not intend to limit myself to the precise construction shown and described, since these may be varied in many respects by the skilled mechanic. For example, although the pawl and ratchet-teeth constitute desirable means for transferring vertical reciprocatory motion to the rammers and for automatically causing the rise of the rammers as the molding operation proceeds, I do not limit myself thereto, since other mechanical devices operating by friction may be used to effect the same result in substantially the same manner.

The items of invention which I intend to cover herein are distinctly and separately summarized in the following claims.

I claim—

1. In a molding apparatus, the combination, with a series of independent rammers, of reciprocating feeding mechanism which upholds and supports the rammers and a series of automatic grip devices which connect the feeding mechanism and rammers to permit the separate and automatic adjustment of the rammers during the molding operation, substantially as and for the purposes described.

2. In a molding apparatus, the combination, with a reciprocating lifting-head, of a series of independent rammers and a corresponding series of pawl-and-rack mechanism for actuating the rammers from the reciprocating head, substantially as and for the purposes described.

3. In a molding apparatus, the combination, with a reciprocating lifting-head, of a series of independent rammers, a corresponding series of pawl-and-rack mechanism for actuating the rammers from the reciprocating head, and trip mechanism for tripping the pawls and releasing the rammers, substantially as and for the purposes described.

4. In a molding apparatus, the combination, with a series of rammers, of independently reciprocatory feeding mechanisms which uphold and operate the rammers and yield to permit independent rise thereof in the progress of the molding operation, substantially as and for the purposes described.

5. In a molding apparatus, the combination of a series of concentric rammer-guides, a series of rammers arranged therein, a reciprocatory head which incloses the series of guide-boxes, and a series of automatic clutch mechanisms for connecting the head and rammers, substantially as and for the purposes described.

6. In a molding apparatus, the combination of a series of independently and laterally adjustable reciprocatory rammers, substantially as and for the purposes described.

7. In a molding apparatus, the combination of reciprocatory rammers, guides therefor, and mechanism for adjusting laterally and inclining the guides, substantially as and for the purposes described.

8. In a molding apparatus, a reciprocatory rammer, a guide-box therefor, and independently-movable bars or supports therefor, and mechanism for shifting said bars or supports, substantially as and for the purposes described.

9. In a molding apparatus, the combination, with a hollow reciprocating lifting-head, of a series of independent rammers arranged within the head, a corresponding series of pawl-and-rack mechanism for actuating the rammers from the reciprocating head, and trip mechanism for tripping the pawls and releasing the rammers, substantially as and for the purposes described.

In testimony whereof I have hereunto set my hand this 4th day of January, A. D. 1890.

JOHN J. FRANKE.

Witnesses:
W. B. CORWIN,
JNO. K. SMITH.